US006536696B2

(12) United States Patent
Fiutak et al.

(10) Patent No.: US 6,536,696 B2
(45) Date of Patent: Mar. 25, 2003

(54) PRINTER HAVING A PAPER SUPPLY ROLL ROTATABLY MOUNTED BY A PAIR OF BEARING MEMBERS

(75) Inventors: Melissa Ann Fiutak, Raleigh, NC (US); Richard Hunter Harris, Raleigh, NC (US); Robert Andrew Myers, Cary, NC (US); Kevin Hunter Vorhees, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/797,094

(22) Filed: Mar. 1, 2001

(65) Prior Publication Data

US 2002/0121566 A1 Sep. 5, 2002

(51) Int. Cl.$^{7}$ .................................................. G03B 1/04

(52) U.S. Cl. ................................ 242/358.1; 242/596.4; 242/596.7; 400/613

(58) Field of Search ........................... 242/358.1, 596.4, 242/596.7, 596.8; 400/613

(56) References Cited

U.S. PATENT DOCUMENTS

| | | | | |
|---|---|---|---|---|
| 1,402,167 A | * | 1/1922 | Kingsbury | 242/596.7 |
| 1,625,190 A | | 4/1927 | Boynton | |
| 2,555,885 A | | 6/1951 | Hope | 242/55.2 |
| 3,729,145 A | * | 4/1973 | Koo et al. | 242/596.7 |
| 4,452,403 A | | 6/1984 | Arronte | 242/55.2 |
| 4,614,312 A | | 9/1986 | Del Pino | 242/55.2 |
| 4,808,800 A | | 2/1989 | Nishijima et al. | 235/58 CF |
| 4,821,974 A | | 4/1989 | Poehlein | 242/68.4 |
| 5,060,877 A | | 10/1991 | Bullivant | 242/55 |
| 5,228,633 A | | 7/1993 | Johnson et al. | 242/55.53 |

* cited by examiner

*Primary Examiner*—John Q. Nguyen
(74) *Attorney, Agent, or Firm*—J. Bruce Schelkopf; Ronald V. Davidge

(57) ABSTRACT

A point of sale printer includes a paper supply mechanism rotatably mounting a paper supply roll within a frame through a resiliently mounted bearing member extending into each end of a central hole in the roll. The frame is manually pivoted between an open position, in which the roll is installed and removed by moving the bearing members outward with movement of the roll, and a closed position, in which the roll is rotatably held in place, with outward movement of the bearing members being prevented by stops within the printer. With the frame in its closed position, a paper web is pulled from the roll for printing. An alternate configuration allows the printer to use a narrow paper roll.

18 Claims, 2 Drawing Sheets

PRINTER HAVING A PAPER SUPPLY ROLL ROTATABLY MOUNTED BY A PAIR OF BEARING MEMBERS

CROSS REFERENCE TO A RELATED APPLICATION

This application is related to a U.S. application Ser. No. 09/797,223, filed on an even day herewith, entitled "Apparatus Providing a Point of Sale Printer with a Large Paper Supply Roll having Controlled Acceleration and Deceleration," having the same assignee as the present invention.

BACKGROUND INFORMATION

1. Field of Invention

This invention relates to a point of sale printer having an internally retained paper supply roll, and, more particularly, to such a printer having a paper supply roll rotatably mounted along a central axis of the paper roll, allowing the printer to operate in various orientations without causing the distortion of print lines due to variations in frictional resistance to paper movement.

2. Background Art

Point of sale printers, which are typically used to print receipts at cash registers, conventionally print on a web of paper extending from a paper supply roll, with the length of the document being printed being conveniently determined by separation of an individual document from the web following printing. Conventionally, the paper supply roll is installed within the printer by dropping it into a paper supply bucket having a support surface shaped as a section of a cylinder. The roll is held in place with its periphery on the support surface by gravity as the paper web is pulled from it and is allowed to rotate on the support surface. Idler rolls, against which the paper supply roll periphery turns, may be used to reduce the frictional loading retarding rotation of the paper supply roll.

One problem with this conventional approach to supporting a paper supply roll arises from the fact that gravity is used to hold the paper supply roll in a particular orientation. This reliance on gravity determines the orientation in which the printer should be placed to operate properly. For example, as long as the printer is resting essentially flat on a horizontal counter top, the direction of gravity can be relied upon to hold the paper supply roll in such a way that the paper web is pulled off the roll smoothly by a paper feed roll within the printer. On the other hand, in many retail establishments counter space suitable for holding a printer near a cash register is not readily available, so there is a desire to mount the printer somewhere else, such as on a vertical wall or otherwise on a shelf. When a conventional point of sale printer is mounted in an unconventional orientation, the paper supply roll does not rest in the support surface of the paper bucket in the normal way, so that the paper web may not pull smoothly from the paper supply roll. Even if the paper drive roll pulling the paper web from the paper supply roll is still able to move the paper web, variations in the frictional characteristics of the means for rotatably mounting the paper supply roll can cause the paper movement to be retarded or uneven, so that visible distortion occurs in the shapes of the characters being printed and in the space between lines of print.

Therefore, what is needed is a way to mount the paper supply roll in a manner which is not dependent on the direction of gravity, so that the printer can be mounted in various orientations according to the desires of the user.

Several U.S. Patents describe mechanisms for rotatably mounting a paper roll, such as a toilet paper roll, by engaging the inner tube of the roll. For example, U.S. Pat. No. 1,625,190 describes a method for mounting the tube to rotate on a pair of spherical bearings extending partly within each end of the cardboard tube. Each spherical bearing moves within a tapered aperture in a side plate and a housing extending outward from the side plate. With the spherical bearings in their lowest position, the spherical balls extend within the cardboard tube; as the balls are raised, they move outward into the housings. An advantage of this method for mounting a roll is that springs are not required to hold the parts in place. Disadvantages are that the roll must be installed in a downward direction and removed in an upward direction, and that the reliance on gravity to hold the roll in place means that the general orientation of the apparatus must be maintained.

U.S. Pat. Nos. 2,555,885 and 4,614,312 describe roll paper holders having with hollow plungers extending into the opposing ends of a tubular roll core. Coil springs extending within the plungers hold partially spherical portions in place within the core, and a flange extending outward from each of the partially spherical portions limits the angle through which a plunger can be tilted. The paper roll is inserted and removed by overcoming the forces exerted by the springs.

U.S. Pat. No. 5,228,633 describes apparatus for holding paper rolls in printing devices, e.g. facsimile machines, in which paper roll supports including conical portions extending into the central hole within a paper roll are urged inwardly by elastomeric foam pads extending between the paper roll supports and end plates.

U.S. Pat. No. 4,452,403 describes a dispenser for material, such as toilet paper, paper towels, or plastic wrap, arranged in a roll, with the dispenser including articulated end pieces that loosely engage the central opening of the roll and hold the roll in position for dispensing. The end pieces are pivotally attached to the frame and are spring biased to urge them into engaging positions. The potential use of such a dispenser in the different application of a paper supply mechanism of a printer is limited by the fact that the roll must be loosely held by flexibly mounted end pieces, providing room for such end pieces to flip into place within the central opening of the roll as the roll is slid into the dispenser. In the application of a paper supply for a printer, the roll should be more tightly held to provide for smooth operation and the keep the paper tracking straight along the paper path.

A further disadvantage in the devices described in U.S. Pat. Nos. 2,555,885, 4,452,402, 4,614,312, and 5,228,633 arises from the fact that the forces holding the plungers or end pieces in place are directly overcome to install or remove a roll being slid within the dispenser, while there is no mechanism to lock the roll within the dispenser when it is not being inserted or removed. Thus, pulling the paper from the dispenser hard enough during normal operation may dislodge the roll within the dispenser. Also, if the roll is mounted in a portable device, such as a point of sale printer, the roll may be dislodged by acceleration forces resulting from moving the device from one location to another.

U.S. Pat. No. 4,821,974 describes a paper roll supply assembly for a large document printer to permit simplified loading and unloading of a media roll. Two end support assemblies are mounted in an axial alignment position. Each end support assembly includes a spindle shaft, a hub assembly, and a coil compression spring. The paper roll support core is seated on tapered surfaces of the hub assemblies; the compression spring allows one end to be urged outward so that, once the media roll is fully seated against the hub assembly, one spring predominates and serves to maintain the roll in a precisely aligned axial position. Each of the tapered surfaces of the hub assemblies is divided into three sections to provide a space between tapered sections into which the paper roll may be pivoted and swung into place.

The assembly of U.S. Pat. No. 4,821,974 has an advantage over other prior art devices in that the hub assemblies are tapered at a low enough angle to prevent dislodging the paper roll as paper is pulled away from the roll or as the device of which the paper roll supply assembly is a part is moved. However, this assembly has a disadvantage of requiring a more difficult process for aligning the paper roll with the mounting hubs and for swinging the paper roll into place. The paper roll cannot merely be slid into place from any direction. Also, this assembly has a disadvantage or requiring much more space within the device for the loading process and for the springs and movable hub assemblies.

The *IBM Technical Disclosure Bulletin*, March, 1972, pp. 3115–3116, describes a dual-spindle support for rolled paper in which the spindles, facing one another when extending within opposing ends of a core within a paper roll, are mounted on hinged support flaps that are pivoted outward to release the paper roll. The support flaps are connected to links, which extend toward one another, and which are pivotally attached to a latch disk at diagonally opposite positions. The latch disk is rotated in a first direction to pivot the support flaps so that the spindles are moved into engagement with the paper roll and opposite the first direction to release the paper roll. The paper support mechanism is shown mounted within a drawer to be slid into a device, such as a copier.

The paper support mechanism thus described in the *IBM Technical Disclosure Bulletin* also has the advantage of latching the paper roll in place on the spindles so that it cannot be dislodged as paper is pulled away from the roll or as the device is moved. However, this mechanism has disadvantages of requiring a fairly complex additional mechanism to move the support flaps and of requiring substantial space within the device for movement of these flaps.

Thus, what is needed is a paper roll support mechanism latching the paper roll to be rotatably held in place during operation without the additional space requirements and complexity disadvantages of the mechanisms described in U.S. Pat. No. 4,821,974 and in the *IBM Technical Disclosure Bulletin.*

SUMMARY OF THE INVENTION

According to one aspect of the present invention, apparatus is provided for mounting a paper supply roll within a printing device. The apparatus includes a paper supply frame, first and second bearing members, first inward and outward motion stops, and a first resilient member. The paper supply frame includes a cavity for holding the paper supply roll and first and second end walls extending along opposite ends of the cavity. The paper supply frame is movable within the printing device between an open position providing access for installation of the paper supply roll into the cavity and for removal of the paper supply roll from the cavity, and a closed position. A paper web is fed from the paper supply roll within the printing device with the paper supply frame in the closed position. The first bearing member, which engages a first end of the paper supply roll at a central hole of the paper supply, includes a first convex roll mounting surface extending into the cavity from the first end wall and is movably mounted within the first end wall to move inward and outward. The second bearing member, which engages a second end of the paper supply roll at the central hole of the paper supply roll, includes a second convex roll mounting surface extending into the cavity from the second end wall. The first inward motion stop limits inward movement of the first bearing member at the first end wall. The first outward motion stop limits outward motion of the first bearing member when the paper supply frame is in the closed position. Movement of the paper supply frame into the open position moves the first bearing member out of engagement with the first outward motion stop. The first resilient member pushes the first bearing member inward.

Preferably, the second bearing member is movably mounted within the second end wall to move inward and outward, with the apparatus additionally including second inward and outward motion stops and a second resilient member. The second inward motion stop limits inward movement of the second bearing member at the second end wall. The second outward motion stop limits outward motion of the second bearing member when the paper supply frame is in the closed position, Movement of the paper supply frame into the open position moves the second bearing member out of engagement with the second outward motion stop. The second resilient member pushes the second bearing member inward.

According to another aspect of the present invention conversion apparatus is provided for converting paper supply apparatus, holding a wide paper roll within a wide cavity between first and second bearing members extending inward from first and second end walls forming portions of a paper supply frame, the second bearing member being pushed inward in a first guide hole within the second end wall by a resilient member, to hold a narrow paper roll. The conversion apparatus includes an intermediate wall and a third bearing member. The intermediate wall, which is removably mounted to the paper supply frame within the wide cavity to form a narrow cavity between the first end wall and the intermediate wall, includes a second guide hole. The third bearing member has a convex roll mounting surface extending into the narrow cavity and an end opposite the convex roll mounting surface extending through the first guide hole to engage the resilient member.

DETAILED DESCRIPTION OF THE INVENTION

Figure 1:
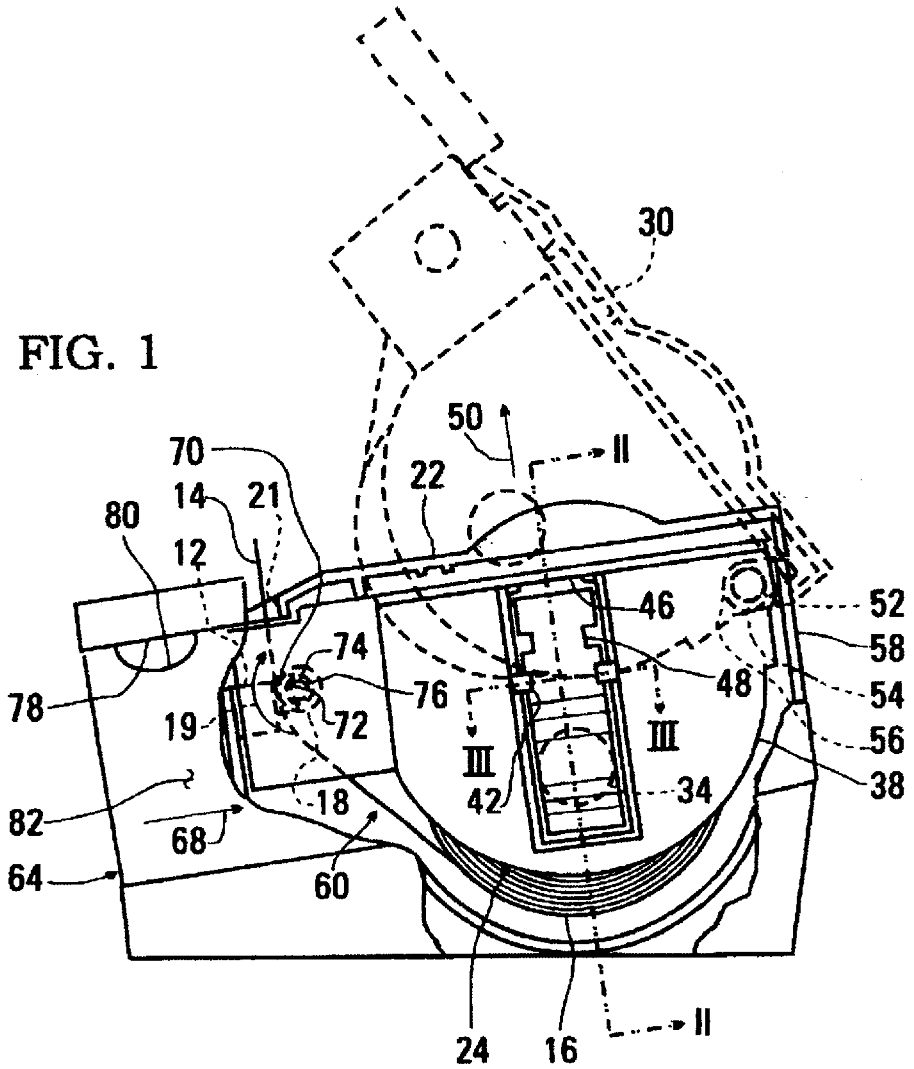
FIG. 1 is a right end elevation of a point of sale printer built in accordance with the present invention, with a portion of end covers shown cut away to reveal a mechanism for holding a paper supply roll.

FIG. 1 is a right end elevation of a point of sale printer, generally indicated as 10, having a print head 12 forming visible images on a paper web 14, being pulled from a paper supply roll 16 by a paper drive roll 18, rotationally driven in the direction of arrow 19. A portion of the right external covers 20 of the printer 10 is shown as cut away to reveal internal details. For example, the print head 12 is a thermal print head having a number of individually driven heating elements to form visible images on the a thermally sensitive paper surface. The print head 12 extends across width of the paper web. A printer of this type is typically used to print sales receipts, with individual receipts being separated after printing by a knife mechanism (not shown). The receipts are driven outward through a slot 21 in a top cover 22. The paper roll 16 and the paper drive roll 18 are both rotatably mounted within a paper supply frame, generally indicated as 24.

Figure 2:
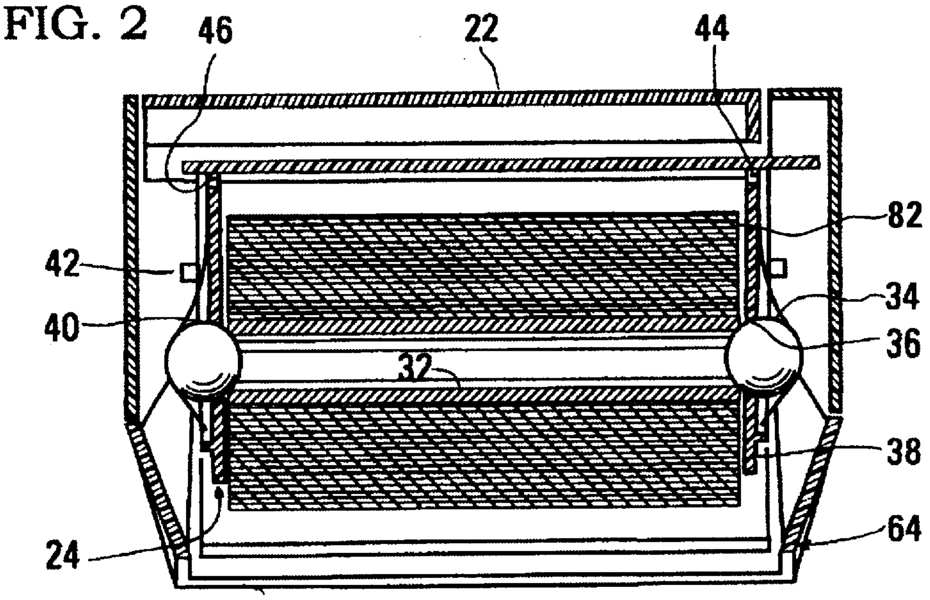
FIG. 2 is a longitudinal cross-sectional view of the printer of FIG. 1, taken as indicated by section lines II—II therein to show the mechanism for holding a paper supply roll.

FIG. 2 is a cross-sectional view of the printer 10 taken as indicated by section lines II—II in FIG. 1 to show a mechanism used to mount the paper roll 16 rotatably within the paper supply frame 24, which is formed as a yoke around a cavity 30 in which the paper roll 16 is mounted. The paper roll 16 is a conventional type, having a central tubular core 32 around which a web of paper is wrapped. The paper roll 16 is rotatably mounted within the paper supply frame 24 by means of a pair of bearing members 34 extending partly through holes 36 in the end walls 38 of the paper supply frame 24, into engagement with the central tubular core 32. Each of the bearing members 34 is held inwardly, in engagement with the tubular core 32, by means of a cantilever spring 40. Each hole 36 has a diameter allowing the bearing member 34 to move partly into the space between the end walls 38 while preventing movement of the bearing member 34 entirely through the hole 36. Thus, each hole 36 acts as an inward motion stop, limiting the inward movement, into the cavity 30, of the associated bearing member 34.

In accordance with the present invention, each of the bearing members 34 includes a convex portion 41 extending into the cavity 30, providing a shape causing the bearing member 34 to move outward as the paper supply roll 16 is moved into or out of the fully engaged position in which it is shown. In the example of FIGS. 1 and 2, each of the bearing members 34 is a spherical ball. This shape has an advantage of presenting a convex portion within the cavity 30, regardless of the orientation of the bearing member 34. Good results have been obtained using a nylon ball for the bearing member 34.

Figure 3:
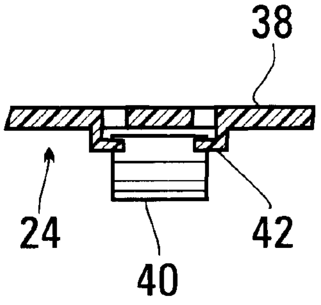
FIG. 3 is a fragmentary cross-sectional view of the printer of FIG. 1, taken as indicated by section lines III—III therein to show features holding a spring within the mechanism for holding a paper supply roll.

FIG. 3 is a fragmentary cross sectional view taken as indicated by section lines III—III in FIG. 1, to show pair of tabs 42 extending outward to hold the cantilever spring 40 in place on an end wall 38 of paper supply frame 24. Referring to FIGS. 1–3, the cantilever spring 40 extends inside these tabs 42 and outside the end wall 38. An upper tab 44 of the cantilever spring 40 extends inward within a slot 46 near the top of the end wall 38. Each cantilever spring 40 is assembled to the end wall 38, over the bearing member 35, by moving the spring 40 inward with a pair of-notches 48 aligned with the tabs 42 extending outward from the end wall 38. This motion brings the tab 44 into contact with the end wall 38, deflecting the cantilever spring 40. Next, the cantilever spring 40 is slid upward, in the direction of arrow 50, until the tab 44 snaps inward within the slot 46.

Continuing to refer to FIGS. 1 and 2, the paper supply frame 24 is mounted to pivot about the aligned axes of a pair of pins 52, which pivot within holes 54 in tabs 56 extending inward from a rear cover wall 58. The top cover 22 is attached to the paper supply frame 24, so that access to the paper path 60 within the printer 10 is obtained by pivoting the top cover 22 and the paper supply frame 24 together between the closed position, in which they are shown, and the open position indicated by dashed lines 62. All external covers of the printer 10, except for the top cover 22, form part of a stationary framework 64, which does not pivot upward with the paper supply frame 24.

The closed position of the paper supply frame 24 is determined by a detent mechanism 66 holding the print head 12 in alignment with the paper drive roll 18. When the paper supply frame 24 is closed, the print head 12 is held against the paper drive roll 18, or against the paper web 14 extending between the print head 12 and the paper drive roll 18, by means of a spring mechanism (not shown) applying a force to the print head 12 in the rearward direction of arrow 68. A stationary detent plate 70, resiliently attached to the print head 12, includes a notch 72 in which a bushing 74, extending around a shaft 76 rotationally driving the paper drive roll 18, is held by the force provided by the spring mechanism. Preferably, the top cover 22 is attached to the paper supply frame 24 in a manner providing for limited movement of the top cover 22 relative to the paper supply frame 24, with the closed position of the top cover 22 being determined by a separate detent mechanism (not shown) so that the top cover 22, when closed, is properly aligned with the other external covers of the printer 10, with the precise alignment of the covers thus not being dependent on the relationship between the stationary detent plate 70 and the bushing 74.

The top cover 22 is opened by pulling upward on a lower surface 78 of the top cover 22, which extends above a notch 80 in a right external cover 20. To pull the top cover 22 open, it is necessary to overcome forces encountered in both the separate detent mechanism (not shown) holding the top cover 22 closed and the detent mechanism 66 holding the paper supply frame 24 in place. After the top cover 22 and the paper supply frame are brought into the open position indicated by dashed lines 62, the paper roll 16, or the empty core 32, is easily removed and replaced. When the roll 16 or core 32 is then pulled radially outward from its position between the end walls 38, the bearing members 34 are moved axially outward, i.e. outward in a direction of the rotational axis of the core 32, against the forces provided by the cantilever springs 40. Similarly, when a new paper roll 16 is inserted between the end wall 38 and moved radially inward, the bearing members 34 are moved axially outward to roll against the ends 82 of the paper roll 16 as the roll is moved into the position in which it is shown in FIGS. 1 and 2. The cantilever springs 40 hold the new roll in place by holding the bearing members 34 axially inward.

The present invention thus has an advantage of simplified paper loading over the prior art device described in U.S. Pat. No. 4,821,974, since the paper roll 16 can be slid directly into place within the mechanism of the present invention, while the paper roll must be aligned with mounting hubs within the prior art device and pivoted into place. Also, with the present invention, less space is required for the mechanism holding the paper roll in place.

Furthermore, the present invention has an advantage of mechanical simplicity when compared to the prior art device described in the *IBM Technical Disclosure Bulletin*, March, 1972, pp. 3115–3116, in that the bearing members 34 of the present invention are moved directly by the removal or insertion of a paper roll, so that the prior art mechanism of a latch disk, links, and pivoted flaps is not required.

While these advantages are achieved by configuring the device of the present invention so that the bearing members 34 are moved axially outward in response to movement of the paper roll 16 between the end walls 38, it is particularly desirable to prevent the misalignment of the paper roll 16 due to pulling the paper in ordinary use of the printer 10 or due to the acceleration forces encountered as the printer 10 is moved from one location to another. According to a preferred version of the present invention, such misalignment of the paper roll 16 is prevented through the use of outward motion limiting structures 84 extending inward as a part of the stationary framework 64 to prevent outward movement of the cantilever springs 40 when the paper supply frame 24 is in its closed position. The process of moving the paper supply frame 24 into its open position, as indicated by dashed lines 62 moves the cantilever springs 40 away from the outward motion limiting structures 84, so that the cantilever springs 40 can be moved outward.

It is understood that the outward motion limiting structures 84 may contact the springs 40 in a manner causing the springs to be trapped between the bearing members 34 and the structures 84, as shown. Alternately, outward motion limiting structures may directly contact the bearing members 34, or the springs 40 in a way preventing deflection of the springs 40 with outward movement of the associated bearing members 34.

Thus, the present invention has the advantage, over the prior art devices using bearing members or conical end supports which are deflected outward by moving the paper roll into place, of including a locking mechanism, preventing the release and subsequent misalignment of the paper roll whenever the paper supply frame 24 and top cover 22 are held closed. This advantage is particularly important within a portable printing device, which is easily moved about, and which may be mounted in various orientations.

Figure 4:
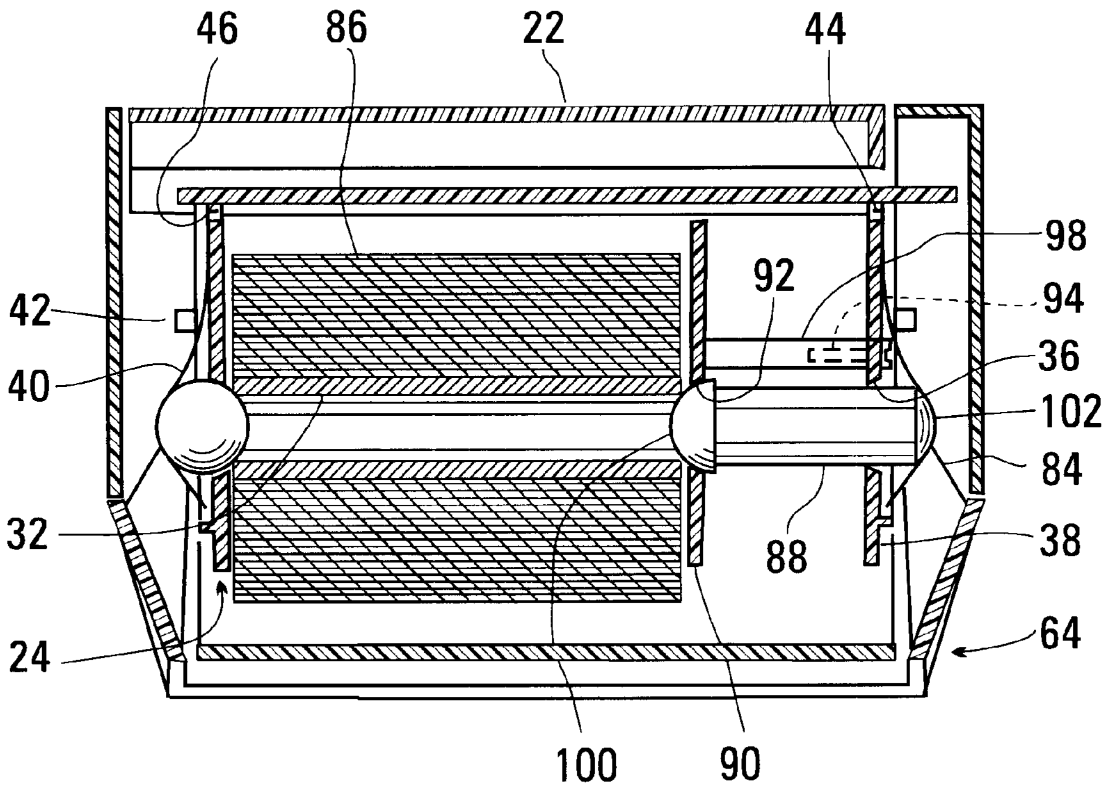
FIG. 4 is a longitudinal cross sectional view of the printer of FIG. 1, taken as indicated by section lines II—II to show the mechanism for holding a paper supply roll in an alternate configuration for use with a narrow paper supply roll.

FIG. 4 is a longitudinal cross sectional view of the point of sale printer 10, taken as indicated by section lines II—II in FIG. 1 to show the mechanism as configured for holding a relatively narrow paper roll 86 in place within the printer 10. As shown in FIG. 4, the printer configuration described above in reference to FIGS. 1–3 has been modified to hold the narrow paper roll 86 by replacing one of the bearing members 34 with an elongated bearing member 88 and by adding an intermediate support wall 90. The intermediate support wall 90, which includes a hole 92 similar to the hole 36 in each of the end walls 38, is held in place by a pair of screws 94 extending through holes 96 (shown in FIG. 1) in one of the end walls 38, into a pair of stand-off cylinders 98 forming portions of the intermediate support wall 90. The inward-extending end of the shaft 84 is formed as a convex surface, such as a hemisphere 100 having a diameter equal to that of the bearing members 34. The outward-extending end 102 of the elongated bearing member 88 is configured to extend through the hole 36 in the associated end wall 38 and to engage the associated cantilever spring 40 in a manner similar to that of the replaced bearing member 34 (shown in FIG. 2), so that the elongated bearing member 88 is held inward by the cantilever spring 40, and so that the associated outward motion limiting structures limit outward movement of the elongated bearing member 88 when the paper supply frame 24 is in its closed position.

In this way, an advantage of manufacturing convenience is achieved over prior art devices not having a method for handling different widths of paper supply rolls. With minor differences between the configuration of FIG. 2 for using a wide roll and the configuration of FIG. 4 for using a narrow roll, a printer 10 may easily be built in either configuration. Furthermore, if desire, a printer 10 can be converted from one paper width to another in the field, with the appropriate parts being supplied as a conversion kit.

While the present invention has been described in versions having a resiliently mounted bearing member 34, 88 at each end of the paper supply roll 16, 86, it is understood that the scope of the present invention includes the use of a resiliently mounted bearing member 34, 88 at only one end of the paper supply roll 16, 86, with the other end of the paper supply roll 16, 86 being supported by a rigidly mounted bearing member.

While the present invention has been described in its preferred form or embodiment with some degree of particularity, it is understood that this description has been given only by way of example and that numerous changes may be made without departing from the spirit and scope of the invention.

What is claimed is:

1. Apparatus for mounting a paper supply roll within a printing device, wherein said apparatus comprises:

a paper supply frame including a cavity for holding said paper supply roll and first and second end walls extending along opposite ends of said cavity, wherein said paper supply frame is movable within said printing device between an open position providing access for installation of said paper supply roll into said cavity and for removal of said paper supply roll from said cavity, and a closed position, wherein a paper web is fed from said paper supply roll within said printing device with said paper supply frame in said closed position;

a first bearing member for engaging a first end of said paper supply roll at a central hole of said paper supply roll, wherein said first bearing member includes a first convex roll mounting surface extending into said cavity from said first end wall, wherein said first bearing member is movably mounted within said first end wall to move inward and outward;

a second bearing member for engaging a second end of said paper supply roll at said central hole of said paper supply roll, wherein said second bearing member includes a second convex roll mounting surface extending into said cavity from said second end wall;

a first inward motion stop at said first end wall limiting inward movement of said first bearing member;

a first resilient member pushing said first bearing member inward; and a first outward motion stop limiting outward motion of said first bearing member when said paper supply frame is in said closed position, wherein movement of said paper supply frame into said open position moves said first bearing member out of engagement with said first outward motion stop without causing outward motion of said first bearing member.

2. The apparatus of claim 1, wherein said second bearing member is movably mounted within said second end wall to move inward and outward, and wherein said apparatus additionally comprises:

a second inward motion stop at said second end wall limiting inward movement of said second bearing member;

a second resilient member pushing said second bearing member inward; and a second outward motion stop limiting outward motion of said second bearing member when said paper supply frame is in said closed position, wherein movement of said paper supply frame into said open position moves said second bearing member out of engagement with said second outward motion stop without causing outward motion of said second bearing member.

3. The apparatus of claim 1, wherein said first bearing member is formed as a spherical ball, said first inward motion stop is formed by a surface of a hole in said first end wall, wherein said first bearing member extends partly through said hole in said first end wall, and said first resilient member includes a cantilever spring extending in contact with said first bearing member to hold said first bearing member against said first inward motion stop.

4. The apparatus of claim 3, wherein said first outward motion stop limits outward movement of said first bearing member by limiting movement of said first resilient member through direct contact between said first outward motion stop and said first resilient member.

5. The apparatus of claim 3, wherein said second bearing member is formed as a spherical ball movably mounted within said second end wall to move inward and outward, and wherein said apparatus additionally comprises:

a second inward motion stop at said second end wall limiting inward movement of said second bearing member, wherein said second inward motion stop is formed by a surface of a hole in said second end wall, wherein said second bearing member extends partly through said hole in said second end wall;

a second resilient member pushing said second bearing member inward, wherein said second resilient member includes a cantilever spring extending in contact with said second bearing member to hold said second bearing member against said second inward motion stop; and a second outward motion stop limiting outward motion of said second bearing member when said paper supply frame is in said closed position, wherein movement of said paper supply frame into said open position moves said second bearing member out of engagement with said second outward motion stop.

6. The apparatus of claim 5, wherein said second outward motion stop limits outward movement of said second bearing member by limiting movement of said second resilient member through direct contact between said second outward motion stop and said second resilient member.

7. The apparatus of claim 3, additionally comprising an intermediate wall extending within said cavity, a second resilient member pushing said second bearing member inward, and a second outward motion stop limiting outward motion of said second bearing member when said paper supply frame is in said closed position, wherein said second bearing member extends through a hole within said second end wall, said second bearing member includes a hemispherical surface extending partly through a hole within said intermediate wall, said hole within said intermediate wall forms a second inward motion stop limiting inward movement of said second bearing member, said second resilient member includes a cantilever spring extending in contact with said second bearing member to hold said second bearing member against said second inward motion stop, and movement of said paper supply frame into said open position moves said second bearing member out of engagement with said second outward motion stop.

8. The apparatus of claim 1, additionally comprising:

an intermediate wall extending within said cavity, wherein said second bearing member is movably mounted to extend between said second end wall and said intermediate wall, and wherein said second convex roll mounting surface extends toward said first bearing member beyond said intermediate wall;

a second resilient member pushing said second bearing member inward; and a second outward motion stop limiting outward motion of said second bearing member when said paper supply frame is in said closed position, wherein movement of said paper supply frame into said open position moves said second bearing member out of engagement with said second outward motion stop.

9. The apparatus of claim 1, wherein said paper supply frame is pivotally mounted within said printing device.

10. A printer causing visible markings to be formed on a web of paper pulled from a paper supply roll, wherein said printer comprises:

a print head forming said visible markings as said web of paper is moved past said print head;

a paper drive roll moving said web of paper past said print head;

a paper supply frame including a cavity for holding said paper supply roll and first and second end walls extending along opposite ends of said cavity, wherein said paper supply frame is movable within said printing device between an open position providing access for installation of said paper supply roll into said cavity and for removal of said paper supply roll from said cavity, and a closed position, wherein a paper web is fed from said paper supply roll within said printing device with said paper supply frame in said closed position;

a first bearing member for engaging a first end of said paper supply roll at a central hole of said paper supply roll, wherein said first bearing member includes a first convex roll mounting surface extending into said cavity from said first end wall, wherein said first bearing member is movably mounted within said first end wall to move inward and outward;

a second bearing member for engaging a second end of said paper supply roll at said central hole of said paper supply roll, wherein said second bearing member includes a second convex roll mounting surface extending into said cavity from said second end wall;

a first inward motion stop at said first end wall limiting inward movement of said first bearing member;

a first resilient member pushing said first bearing member inward; and a stationary framework including a first outward motion stop limiting outward motion of said first bearing member when said paper supply frame is in said closed position, wherein movement of said paper supply frame into said open position moves said first bearing member out of engagement with said first outward motion stop without causing outward motion of said first bearing member.

11. The printer of claim 10, wherein said second bearing member is movably mounted within said second end wall to move inward and outward, said stationary framework additionally includes a second outward motion stop limiting outward motion of said second bearing member when said paper supply frame is in said closed position, wherein movement of said paper supply frame into said open position moves said second bearing member out of engagement with said second outward motion stop, and said printer additionally comprises a second inward motion stop at said second end wall limiting inward movement of said second bearing member, and a second resilient member pushing said second bearing member inward without causing outward motion of said second bearing member.

12. The printer of claim 10, wherein said first bearing member is formed as a spherical ball, said first inward motion stop is formed by a surface of a hole in said first end wall, wherein said first bearing member extends partly through said hole in said first end wall, and said first resilient member includes a cantilever spring extending in contact with said first bearing member to hold said first bearing member against said first inward motion stop.

13. The printer of claim 12, wherein said first outward motion stop limits outward movement of said first bearing member by limiting movement of said first resilient member through direct contact between said first outward motion stop and said first resilient member.

14. The printer of claim 12, wherein said second bearing member is formed as a spherical ball movably mounted within said second end wall to move inward and outward, and wherein said printer additionally comprises:

a second inward motion stop at said second end wall limiting inward movement of said second bearing member, wherein said second inward motion stop is formed by a surface of a hole in said second end wall, wherein said second bearing member extends partly through said hole in said second end wall;

a second resilient member pushing said second bearing member inward, wherein said second resilient member includes a cantilever spring extending in contact with said second bearing member to hold said second bearing member against said second inward motion stop; and a second outward motion stop limiting outward motion of said second bearing member when said paper supply frame is in said closed position, wherein movement of said paper supply frame into said open position moves said second bearing member out of engagement with said second outward motion stop.

15. The printer of claim 14, wherein said second outward motion stop limits outward movement of said second bearing member by limiting movement of said second resilient member through direct contact between said second outward motion stop and said second resilient member.

16. The printer of claim 12, additionally comprising an intermediate wall extending within said cavity, a second resilient member pushing said second bearing member inward, and a second outward motion stop limiting outward motion of said second bearing member when said paper supply frame is in said closed position, wherein said second bearing member extends through a hole within said second end wall, said second bearing member includes a hemispherical surface extending partly through a hole within said intermediate wall, said hole within said intermediate wall forms a second inward motion stop limiting inward movement of said second bearing member, said second resilient member includes a cantilever spring extending in contact with said second bearing member to hold said second bearing member against said second inward motion stop, and movement of said paper supply frame into said open position moves said second bearing member out of engagement with said second outward motion stop.

17. The printer of claim 10, additionally comprising:

an intermediate wall extending within said cavity, wherein said second bearing member is movably mounted to extend between said second end wall and said intermediate wall, and wherein said second convex roll mounting surface extends toward said first bearing member beyond said intermediate wall;

a second resilient member pushing said second bearing member inward; and a second outward motion stop limiting outward motion of said second bearing member when said paper supply frame is in said closed position, wherein movement of said paper supply frame into said open position moves said second bearing member out of engagement with said second outward motion stop.

18. The printer of claim 10, wherein said paper supply frame is pivotally mounted within said stationary framework.

* * * * *